(12) United States Patent  (10) Patent No.: US 9,335,157 B2
Heath  (45) Date of Patent: May 10, 2016

(54) DIFFERENTIAL LIGHTING

(71) Applicant: Electronics for Imaging, Inc., Fremont, CA (US)

(72) Inventor: Peter Heath, Alexandria, NH (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 14/514,220

(22) Filed: Oct. 14, 2014

(65) Prior Publication Data

US 2016/0102967 A1  Apr. 14, 2016

(51) Int. Cl.
*G01B 11/02*  (2006.01)
*G01B 11/06*  (2006.01)
*B41J 29/393*  (2006.01)

(52) U.S. Cl.
CPC .......... *G01B 11/0616* (2013.01); *B41J 29/393* (2013.01)

(58) Field of Classification Search
USPC ........ 356/626–630, 237.1–237.5, 445, 239.2, 356/239.3, 239.8; 437/11, 102; 382/162
See application file for complete search history.

(56) References Cited

U.S. PATENT DOCUMENTS

| | | | | |
|---|---|---|---|---|
| 4,806,776 A | * | 2/1989 | Kley | 250/559.24 |
| 6,178,254 B1 | * | 1/2001 | Rappette et al. | 382/112 |
| 7,193,697 B2 | * | 3/2007 | Sung et al. | 356/237.1 |
| 7,463,355 B1 | * | 12/2008 | Zawaideh | 356/364 |
| 8,441,700 B2 | * | 5/2013 | Noffke | 358/509 |
| 2003/0189609 A1 | * | 10/2003 | Ishikawa | 347/11 |
| 2008/0137086 A1 | * | 6/2008 | Imura | 356/433 |
| 2008/0278729 A1 | * | 11/2008 | Kim | 356/450 |
| 2009/0177428 A1 | * | 7/2009 | Iden | 702/94 |
| 2009/0185186 A1 | * | 7/2009 | Shang et al. | 356/432 |
| 2012/0044504 A1 | * | 2/2012 | Ohnishi et al. | 356/602 |
| 2012/0318775 A1 | * | 12/2012 | Schwarz | 219/121.63 |
| 2013/0057868 A1 | * | 3/2013 | Oba et al. | 356/445 |

* cited by examiner

*Primary Examiner* — Sang Nguyen
(74) *Attorney, Agent, or Firm* — Perkins Coie LLP

(57) ABSTRACT

Described is a technology for measuring ink film thickness by use of differential lighting between two differently positioned light sources. The technology involves an image capture device, a first set of light emitting diodes (LEDs), and a second set of LEDs, where the image capture device is attached to a printer. The first set of LEDs is positioned in parallel to an image capture axis to illuminate a target object evenly from above with a light perpendicular to the target object (e.g., substrate with deposited ink droplets). The second set of LEDs is positioned to illuminate the target object at an angle, thereby casting a shadow. The image capture device takes two snapshots of the target object, utilizing a different light source (of the two sets of LEDs) for each snapshot. The snapshots are compared to determine the shadow's magnitude and the ink film thickness based on the shadow.

8 Claims, 8 Drawing Sheets

DIFFERENTIAL LIGHTING

TECHNICAL FIELD

The disclosure relates generally to measuring of ink film thickness, and more particularly, to measuring of ink film thickness by comparing captured images of lighting cast on a printed substrate.

BACKGROUND

Proper control of the amount of ink applied to a printing substrate (i.e., ink film thickness) is one of the most important considerations for optimization of printer performance. Different printers typically deposit different amounts of ink. Ultra-violet (UV) printers, for example, print images by expelling a relatively thick layer of ink onto the printed media, as compared to water-based printers. In order to determine how well a particular printer is working, printer manufacturers typically measure the drop mass of ink droplets applied to a printed substrate (i.e., weight of ink per area of print). Using the calculated drop mass, the manufacturers can adjust various aspects (e.g., ink formulation, printing process, substrate) to optimize performance of the particular printer. This drop-mass measurement, however, generally requires the cutting and weighing of a portion of the printed substrate (e.g., the total weight of the cut-out portion divided by the X millions of drops in the cut-out portion), and such cutting and weighing can be cumbersome processes.

SUMMARY

Figure 1A:
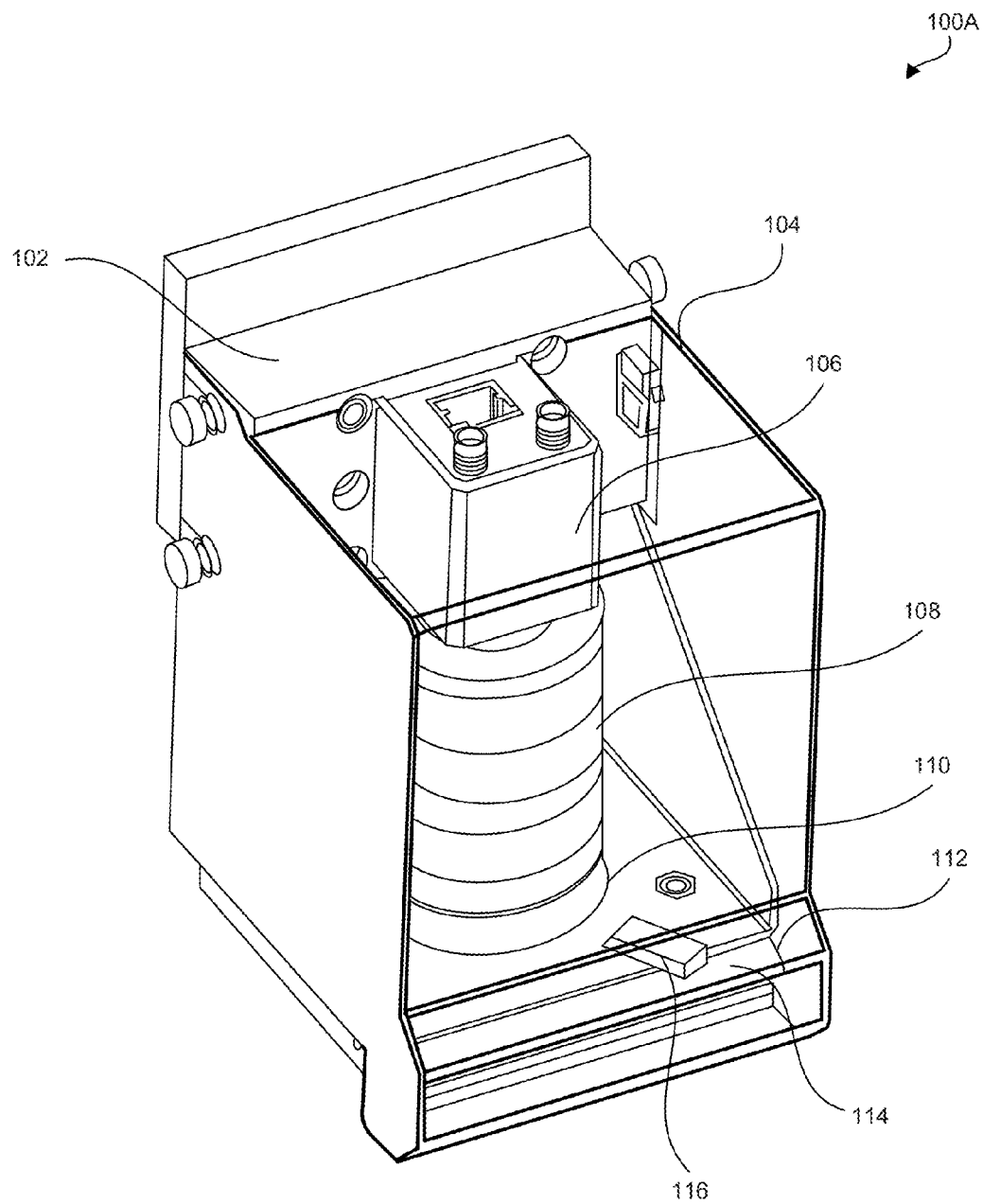
FIG. 1A illustrates a side perspective of an imaging system for use in the disclosed technology.

At least one embodiment of the disclosed technology provides a method and apparatus for measuring ink film thickness based on the differential lighting cast on a printed image. An apparatus, including a camera, a first and second set of light emitting diodes (LEDs), is provided. The apparatus can be mounted within a printer to examine the printer's output (i.e., measure the ink film thickness of the printed image). The first set of LEDs is positioned to shine in parallel to the image capture axis to produce a first light perpendicular to a target object (i.e., the printed image), such that the first set of LEDs shines the target object evenly from above, where the target object has a height relative to a surface. The second set of LEDs is positioned to illuminate the target object at an angle, intentionally casting a shadow on the object. A method, including capturing two camera images of the target object using each set of LEDs separately, is also provided. The method further includes comparing the two captured images to determine and measure the shadow cast on the target object. In some embodiments, a method and apparatus for calibrating the apparatus is provided. In such embodiments, the shadow of an object with a known height is determined and measured using the two sets of LEDs. This shadow is then utilized as a reference for calculation of other unknown objects, such as the target object.

DETAILED DESCRIPTION

Disclosed is a technology of measuring ink film thickness based on differential lighting ("the disclosed technology"). Briefly described, the disclosed technology enables a printer, by using its on-board camera and two sets of LEDs, to measure the height of ink deposited on a substrate (i.e., "the target object") for calculation of the ink film thickness. In at least some embodiments, the disclosed technology involves coordination between a camera with a fixed focus lens, a first set of LEDs, and a second set of LEDs.

According to some embodiments, the camera is mounted within a printer, such as one being evaluated for its output (and, in turn, performance). The first set of LEDs includes multiple LEDs arranged in a circular ring that operates as a "ring light" to provide a constant source of light. The first set of LEDs is mounted adjacent to the camera to shine parallel with respect to the image capture access of the camera and to illuminate a target object with a perpendicular light source; that is, the ring light illuminates the target object evenly from above. The second set of LEDs includes multiple LEDs arranged in a row with one another (i.e., a strip of LEDs), and is mounted to illuminate the target object at an angle, thereby casting a shadow on the target object.

The camera takes two snapshots of the target object (i.e., photographs the target object), where the camera remains in the same position, but utilizes a different light source (of the two sets of LEDs) for each snapshot. The two snapshots are then compared to determine and measure the shadow created by the second set of LEDs. Measurement of the shadow allows for calculation of the ink film thickness. In some embodiments, the disclosed technology involves a calibration process that includes measuring the height of an known object and utilizing that measurement as a reference.

Among other benefits, the disclosed technology enables a printer to measure height of various objects (i.e., ink deposited on a substrate) by using an image capture device (e.g., a camera), thereby eliminating the need to cut out and weigh a portion of the substrate to determine the ink film thickness. Further, the disclosed technology can merely utilize a printer's existing, on-board, mounted camera along with an additional inexpensive LED light source, thereby enabling a more cost effective solution for determining the ink film thickness than a solution that requires, e.g., adding a dedicated sensor (e.g., ultrasonic, laser, etc.).

Note that while the above discussion uses the disclosed technology for measuring a thickness of ink (and in turn, its volume) according to some embodiments, in other embodiments, the disclosed technology can be used in other applications. For example, the disclosed technology can be used for measuring other objects, such as media thickness verification. In another example, by using a light placed at an angle ("angled light"), the disclosed technology can enable an operator to more easily see a double-fed printer sheet (e.g., a second sheet is pulled into the printer after the first sheet). This is so because, with the angled light, the operator can see the shadow, rather than just white media on white media. In yet another example, in accordance with the disclosure of the disclosed technology, an operator, by calibrating the image capture device (e.g., a camera) in one location, can measure the same object at multiple locations across the printer to determine if the print platen/table is parallel to the carriage.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Exemplary Hardware

Figure 1B:
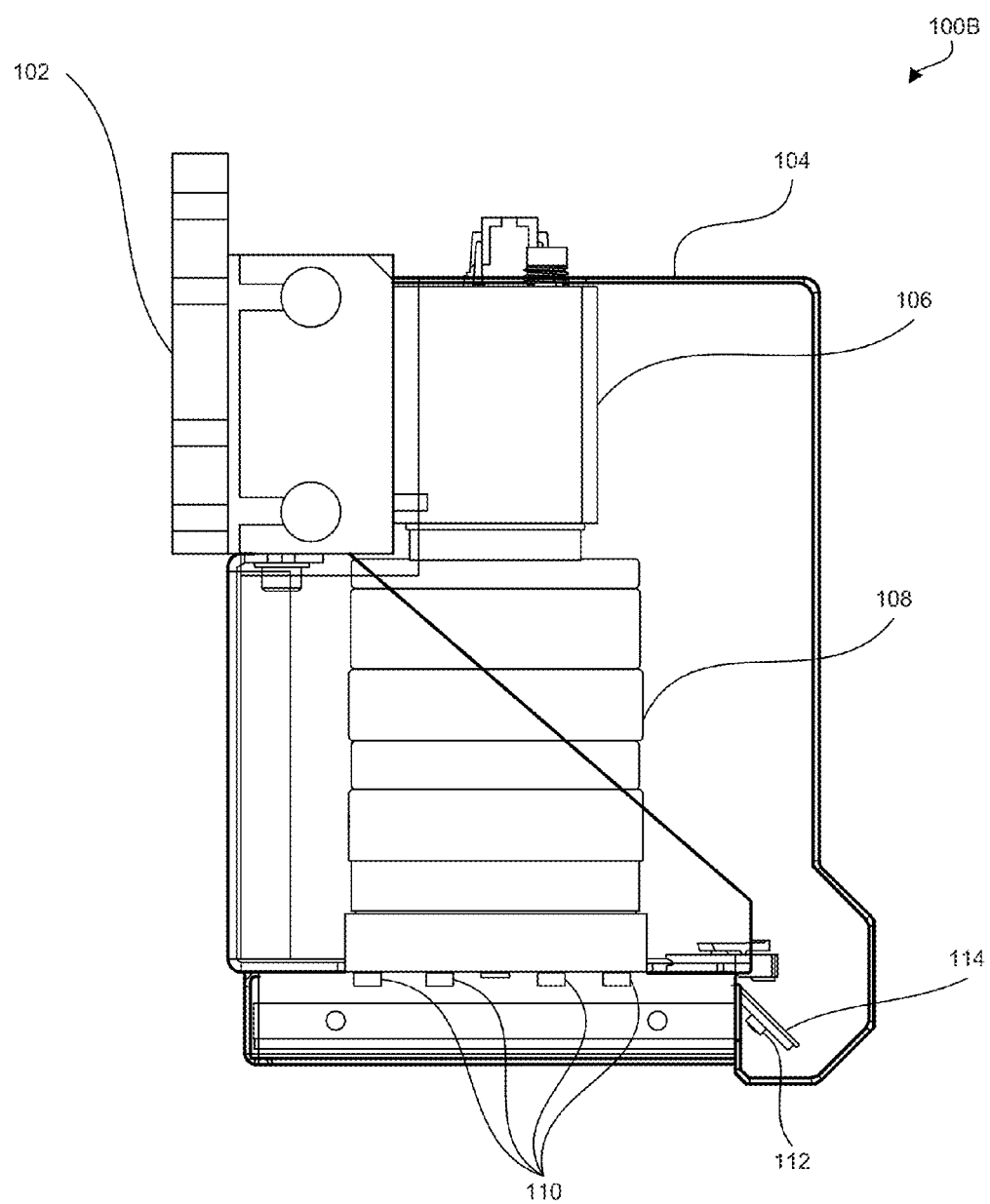
FIG. 1B illustrates a side perspective of an imaging system for use in the disclosed technology.

FIGS. 1A and 1B illustrate different perspectives of an imaging system for use in the disclosed technology. In some embodiments, the imaging system (or hardware) discussed in FIG. 1 is retrofitted into a printer. In some embodiments, the imaging system is embedded into the printer at the time of manufacture. An example printer in which the imaging system can be utilized is the VUTEk HS100 Pro from EFI™.

In the illustrated embodiment of FIG. 1A, an imaging system 100A can be attached to a printer (not shown) by a main bracket 102 that secures the imaging system 100A to a printer carriage. The imaging system 100A includes a housing 104, an image capture device 106 (e.g., a camera), a lens 108, and associated mechanical components and interface electronics (not discussed for the sake of simplicity, as these aspects are not germane to the current discussion of the disclosed technology). In one example, the image capture device 106 is a Gigabit Ethernet 5MP color CMOS camera having a 16 mm lens with a 0.060" spacer for increased magnification. Other image capture devices can include, for example, the SenTech® STC Autofocus block camera (integrated zoom lens), the JAI® 3-CCD with Navitar® high zoom lens, or the Baumer® MX embedded camera with extension tube and microscope objective. Those skilled in the art will appreciate that other cameras, sensors, and/or lenses may be used in connection with the disclosed technology. The imaging system 100A may be referred in the following discussion as a camera assembly 100A.

In some embodiments, the camera assembly 100A also includes a first set of LEDs 110, a second set of LEDs 112, and a lighting power connection 116. According to the embodiments, the first set of LEDs 110 is series of LEDs arranged, or aligned, in a circular formation (i.e., a ring of LEDs or "ring light"). The multiple LEDs in the first set of LEDs 110 are mounted toward the base of the main bracket 102 and positioned in parallel with respect to an image capture axis of the image capture device. As used here, the term "image capture axis" refers to an axis (e.g., an imaginary line drawn) extending from the front plane of the imaging device to the surface to be imaged. In some embodiments, the first set of LEDs 110 are mounted adjacent to the lens 108 to be in parallel to the image capture axis, thereby enabling the LEDs to produce a light perpendicular to a surface (e.g., a substrate having ink deposited, or printed, thereon). The deposited ink can have a height relative to the surface. Note in some embodiments, the lens 108 may not be necessary; that is, an alternative imaging device that does not use a lens can be used in some implementations of the disclosed technology.

In some embodiments, the second set of LEDs 112 is a series of LEDs arranged, or aligned, in a single row formation (i.e., a strip of LEDs) that are secured to a bent bracket extension 114. The bent bracket extension 114 enables the strip of LEDs to be positioned relative to the image capture axis of the image capture device, e.g., along a front edge. The multiple LEDs of the second set of LEDs 112 can be secured to the bent bracket extension 114 by use of an adhesive (e.g., a 3M® 442 double-side tape). In one example, a standard LED strip that comes as Self-Adhesive (e.g., peel & stick) can be used for the second set of LEDs 112. In another example, a small circuit board (e.g., PCB) mounted with screws can be used for the second set of LEDs 112. The bent bracket extension 114 allows the strip of LEDs (i.e., second set of LEDs 112) to be mounted at an angle. This angle enables the camera assembly 100A to cast a shadow onto a target object. In some embodiments, the optimal range of angles is between 80° to 85°.

FIG. 1B illustrates a side perspective of an imaging system 100B that includes the main bracket 102, the housing 104, the image capture device 106, the lens 108, and the associated mechanical components and interface electronics. As illustrated in the side perspective of FIG. 1B, the first set of LEDs 110 are mounted toward the base and adjacent to the lens 108, and the second set of LEDs 112 are arranged in a single row along the bent bracket extension 114 to illuminate onto an object at an angle.

Figure 2:
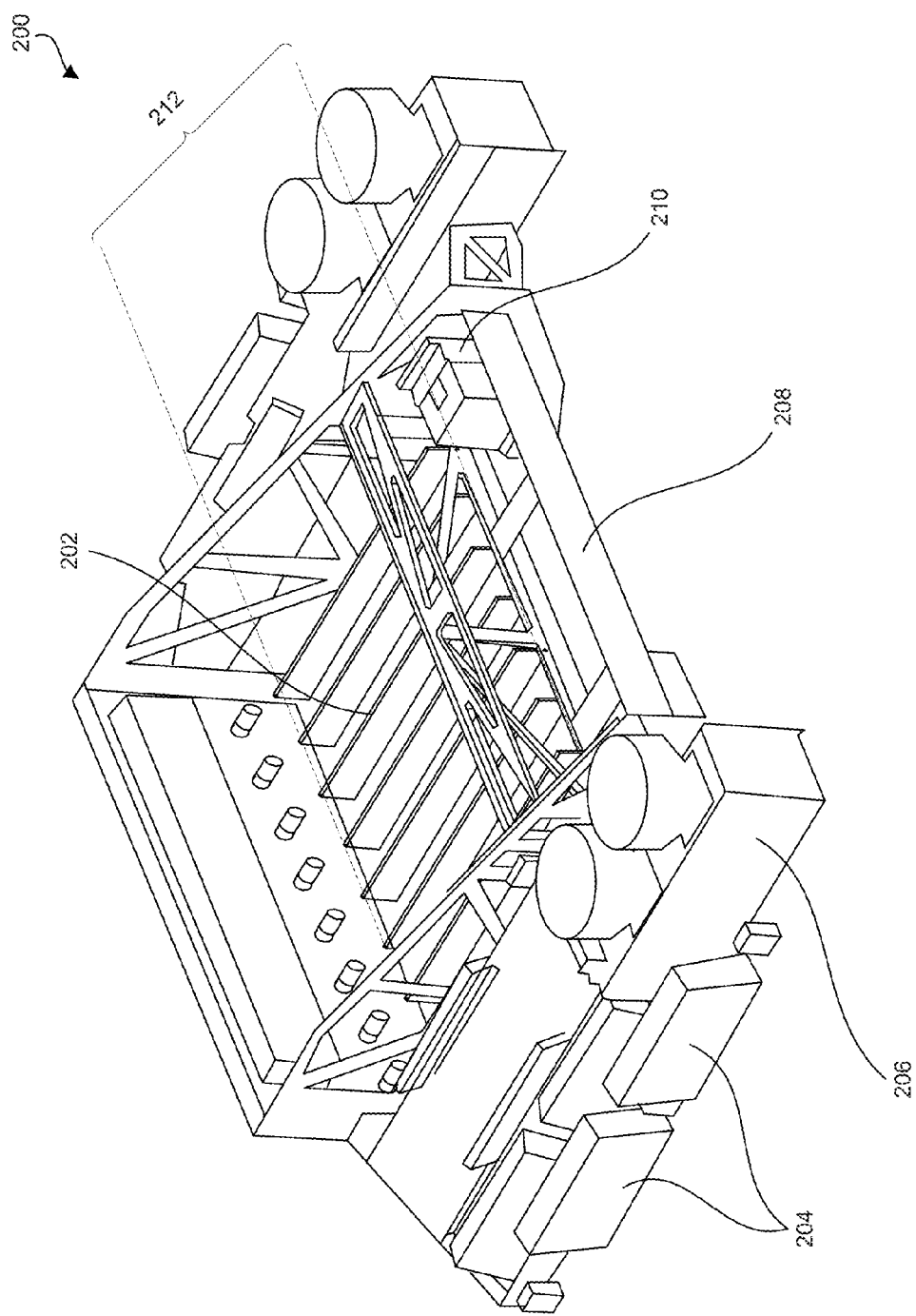
FIG. 2 illustrates a mounting of the imaging system within a printer.

FIG. 2 illustrates a mounting of an imaging system 210 within a printer 200 according to some embodiments. The imaging system 210 can be the imaging system 100A, 100B discussed in FIGS. 1A-1B. In the illustrated embodiment of FIG. 2, the printer 200 is a UV printer that includes a series of print heads 202, ultraviolet (UV) LED pin lamps 204, an UV arc cure lamp 206, and a printer carriage 208. The printer 200 can also include other conventional components of a UV printer, where those components are not discussed for the sake of simplicity of the discussion here. The pin lamps 204 enables an operator, for example, to adjust the matte/gloss level of the printer output. The UV arc cure lamps 206 enables an operator, for example, to insure solid ink cure and adhesion. Note that the disclosed technology can also be employed in systems with only cure lamps (e.g., Arc or LED). During operation, the printer carriage 208 travels horizontally (e.g., via x-axis) facilitating the print heads 202 as the medium moves vertically (e.g., via y-axis) to enable ink to be deposited onto the medium within a print zone 212. The imaging system 210 is mounted after the print zone, where the print heads 202 have finished printing onto the medium. In this mounted position, the imaging system 210 can photograph the printed medium and perform the ink film thickness measurement, as will be discussed below in further details in FIG. 3.

Figure 3:
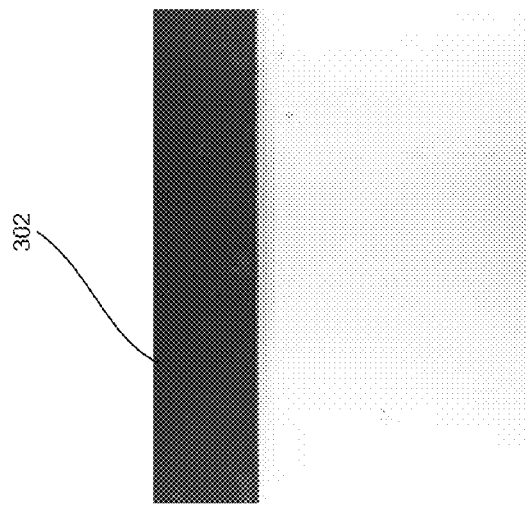
FIG. 3 sample snapshots taken by an imaging system using two different sets of LEDs.
Figure 3:
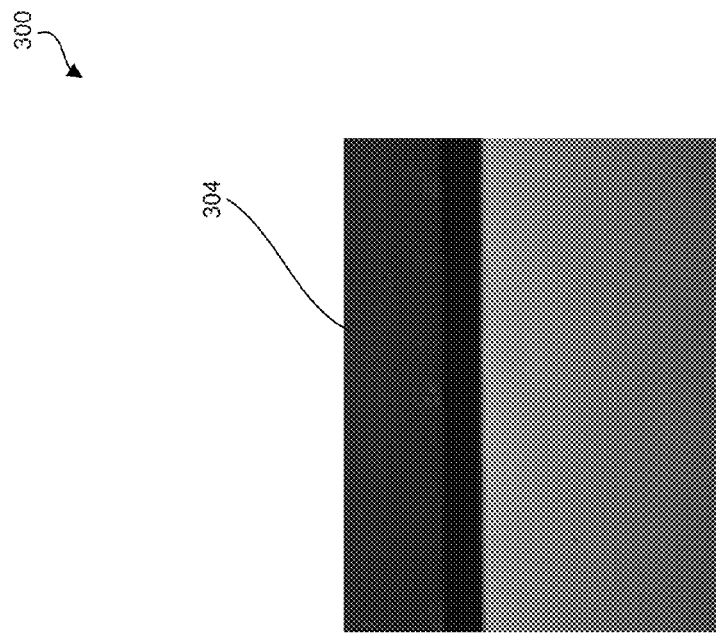

FIG. 3 illustrates sample snapshots taken by an imaging system using two different sets of LEDs. In the illustrated embodiment of FIG. 3, consider an example scenario in which the imaging system, such as the one discussed in FIGS. 1A and 1B, is used to capture light produced by separate light sources to produce two corresponding images. In particular, the corresponding images can be embodied as two snapshots of a layer of ink droplets deposited onto a medium, or substrate, by a printer. A first snapshot 302 is an image captured by an image capture device, such as a camera, using a first light source (i.e., the first set of LEDs discussed above with reference to FIG. 1), where the first light source is positioned in parallel to the image capture axis associated with the image capture device to shine a light perpendicular to the layer of ink droplets. A second snapshot 304 is an image captured by the same image capture device (which remains in the same position) using a second light source (i.e., the second set of LEDs discussed above with reference to FIG. 1), where the second light source is positioned at a steep angle with respect to the layer of ink droplets. The second snapshot shows the shadows (cast by the droplets) that are a result of the steep angle of the second light source.

With the two snapshots 302, 304, one with each light source, the shadows are easily detectable and easily measured with a simple thresholding calculation method to determine the threshold. As used here, the term "threshold" refers to the point where pixel brightness is considered either background or object. In some embodiments, the threshold can be calculated by evaluating the lower 20% of a particular image. In such embodiments, each column of a particular image is scanned from the bottom up to find the edges. A transition is found for each column and a best fit line (e.g., y=mx+b) is calculated. The slopes of the parallel light line and the angled light line are compared to help verify whether the data is valid. Then, the location at the midpoint calculated. In some embodiments, the detection of the edges can be improved by identifying the object first as the largest "blob" in order to eliminate dust and noise. Thresholding could be improved by using the Otsu or other Histogram-based method. Other image processing techniques can be employed to improve the detection process.

Figure 5:
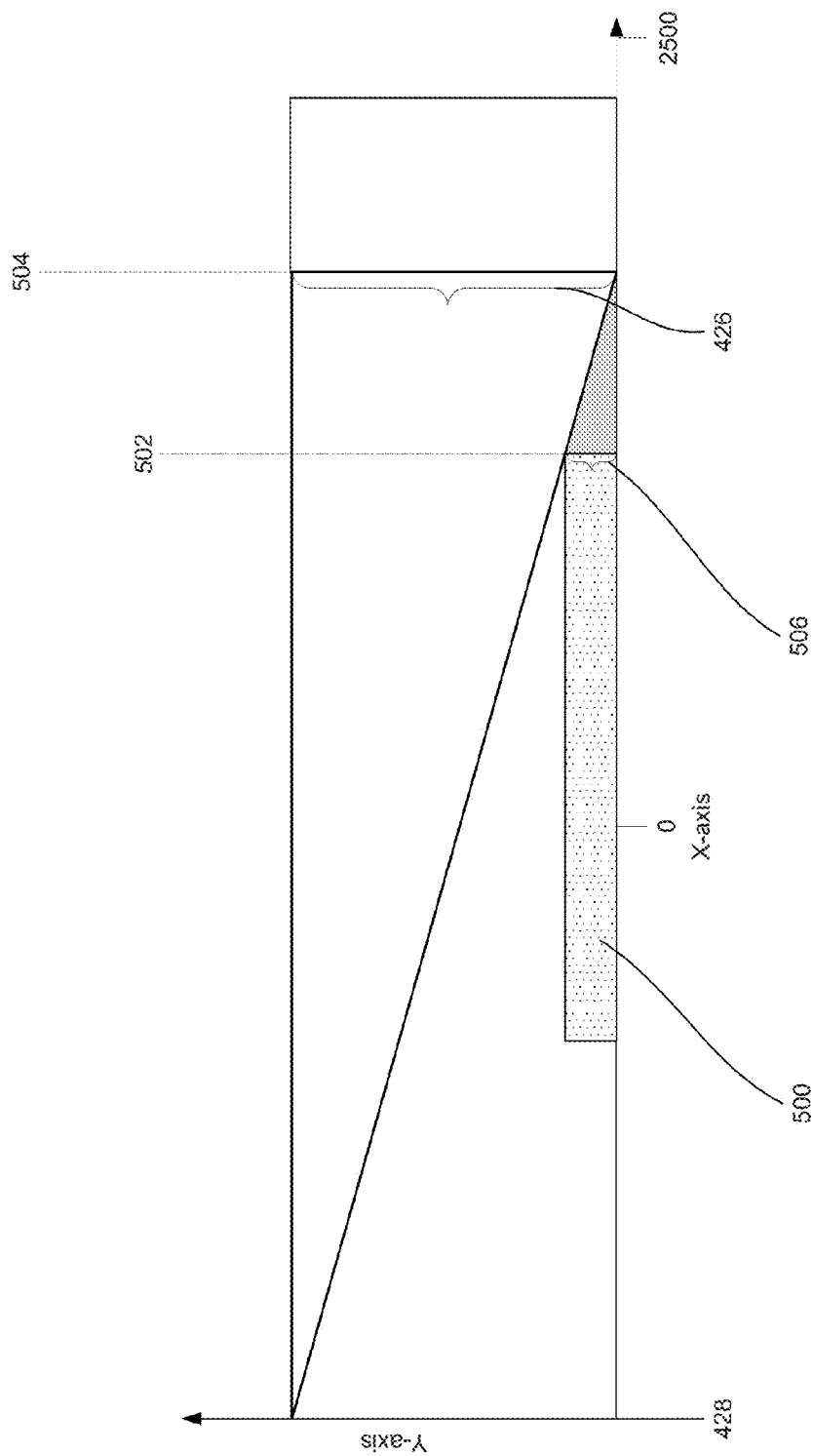
FIG. 5 illustrates measurement data associated with the imaging system.

Note that, as illustrated in the embodiment of FIG. 5, the two sample snapshots 302, 304 show the shadow cast by a thin object (i.e., thin layer of ink). Taller objects, however, will cast longer shadows. By using this premise, the measurement of ink film thickness can be calculated. In particular, by using a known object, it is possible to calibrate software to have a direct correlation between the shadow's size, or magnitude, in pixels and the object's height.

In some embodiments, by controlling the lighting and minimizing the bright hotspots, an image capture device's aperture can be reduced to allow for a greater depth of field. Improved depth of field means the surface to be measured and the base can be in focus simultaneously, resulting in a sharper shadow definition. Sharper shadows have higher contrast and are more reliably detected. Additional details regarding the field of view and resolution is discussed in FIG. 6.

Figure 4:
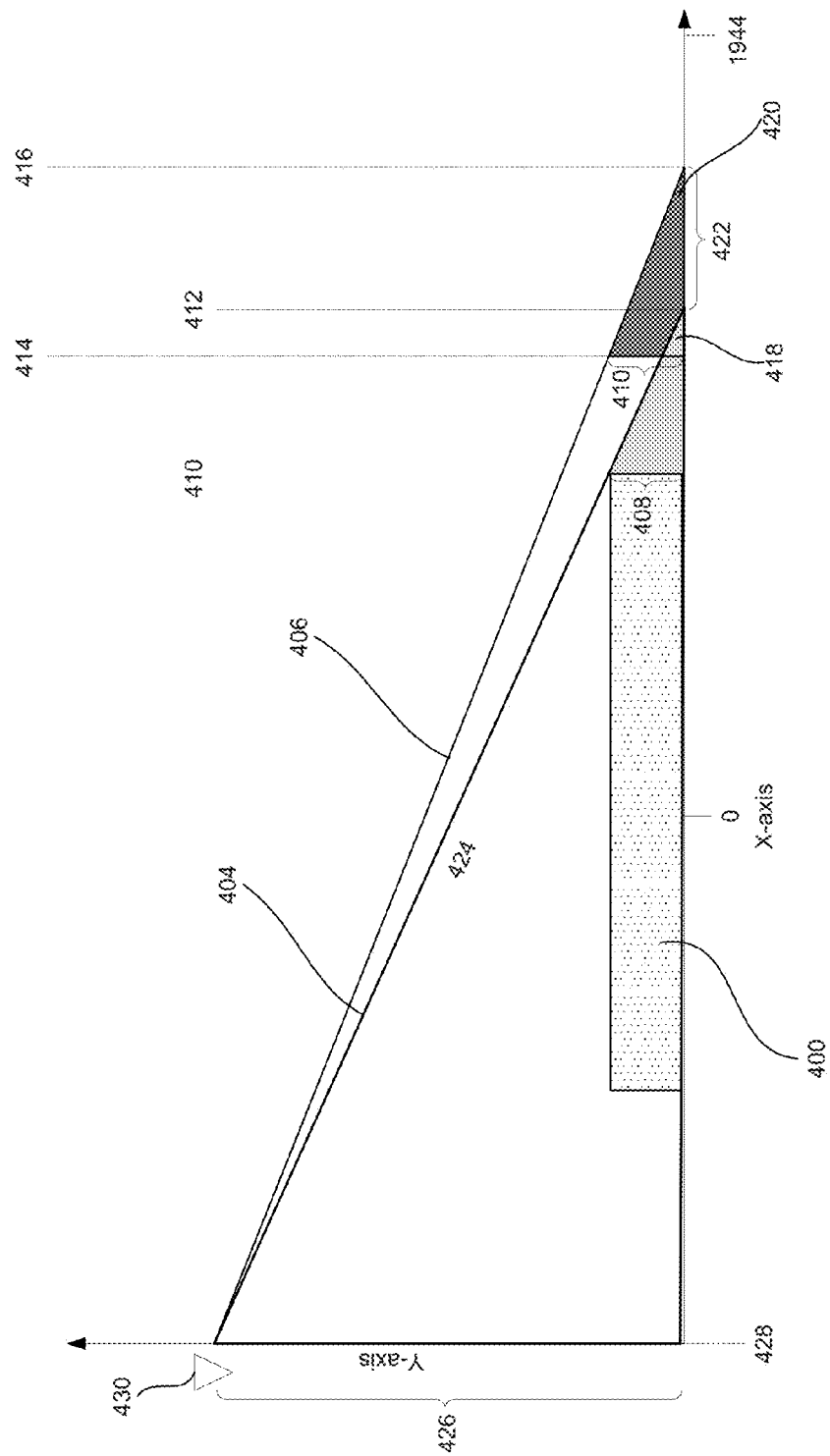
FIG. 4 illustrates measurement data associated with a calibration of the imaging system.

FIG. 4 illustrates measurement data associated with a calibration of the imaging system. According to the embodiment of FIG. 4, calibration of the imaging system is first performed before the determination of the ink film thickness (and/or drop volume). By using a known object, it is possible to calibrate software to have a direct correlation between the shadow's size, or magnitude, in pixels and the object's height.

In accordance with the embodiment of FIG. 4, calibration of the imaging system is accomplished using four image captures, or snapshots, of an object 400 of a known height that can provide a reference in the calibration process. First, the object 400 is captured in a position A by an image capture device, such as a camera, using a first light source. The object's shadow is captured again by the same camera using a second light source 430. The measurements associated with a "triangle" 404 are associated with position A. Second, the object 400 is moved to another location, a position B, within the field of view. The object 400 is then captured in position B by the camera using the first light source, and again in position B, but using the second light source. The measurements associated with a "triangle" 406 are associated with position B. As a result, the four images (from positions A and B) are measured to find their respective edges (as discussed above with reference to FIG. 3).

Note that the object 400 of known height can be caused to move, or be placed, at positions A and B by a human or a machine configuration or mechanism controlled by programmable software. The term "cause" and variations thereof, as used in the preceding paragraph and elsewhere in this description, refers to either direct causation or indirect causation. For example, a computer system can "cause" an action by sending a message to a second computer system that commands, requests or prompts the second computer system to perform the action (e.g., mechanical system controlled by software). Any number of intermediary devices may examine and/or relay the message during this process. In this regard, a device can "cause" an action even though it may not be known to the device whether the action will ultimately be executed or completed. In another example, a human administrator of the computer system can "cause" an action by inputting a command message that commands, requests or prompts the computer system to perform the action (e.g., by communicating with a mechanical mechanism or by communicating with one or more other computer systems that communicates with the mechanical mechanism).

Referring to the illustration of FIG. 4, images of the object 400 with a thickness 408 of 0.0630" are captured. At position A, the size, or magnitude, of the object 400's edge 410 ("$A_E$") is measured at 665.55px (within the camera field of view). In the same position A, the size, or magnitude, of the shadow ("$A_S$") is measured at 1032.76px. When the object 400 is moved to position B, the magnitude of its edge 414 ("$B_E$") is measured at 729.88px and the magnitude of its shadow 416 ("$B_S$") is measured at 1102.52px. Note that "px" indicates camera pixels and " indicates inches.

With the measured shadow lengths, an angle (e.g., 418 and 420) of the second (angled) light source at the respective positions A and B can be calculated by use of trigonometry as follows:

$$a = (\tan^{-1})\left(\frac{t}{A_S - A_E}\right) = \qquad \text{Equation 1}$$

$$\text{atan}(63/(1032.76 - 665.55)) = 9.735°$$

where position A has the light source at an angle $a$.

$$b = (\tan^{-1})\left(\frac{t}{B_S - B_E}\right) = \qquad \text{Equation 2}$$

$$\text{atan}(63/(1102.52 - 729.88)) = 9.596°$$

where position B has the light source at an angle $b$.

Accordingly, based on the above calculations, the angle 418 is 9.735° and the angle 420 is 9.596°. With the measured shadow lengths (or magnitudes), a distance 422 between the two shadows can be calculated. Further, using this calculated distance 422 and the two angles 418, 420 (calculated from equations 1 and 2), a distance 424 to the light source can be calculated as follows:

$$c = a - b = 0.139° \qquad \text{Equation 3}$$

$$C_S = B_S - A_S = 1102.52 - 1032.76 = 69.77 \qquad \text{Equation 4}$$

$$D = \frac{C_S}{\sin c} * \sin b = \frac{69.77}{\sin(0.139)} * \sin(9.596) = 4786.74 \quad \text{Equation 5}$$

Accordingly, the distance 424 is calculated to be 4786.74. With the calculated distance 424, a height 426 of the light source 430 (i.e., "vertical magnitude") and a position 428 of the light source 430 (i.e., "horizontal magnitude") can be calculated as follows:

$$y = \sin a * D = 809.42 \text{(i.e., vertical magnitude)} \quad \text{Equation 6:}$$

$$x = \cos a * D = 4717.81 \text{(i.e., horizontal magnitude)} \quad \text{Equation 7:}$$

The result of Equation 7 (i.e., value of "x") needs to be converted into camera pixels. Accordingly, the height 426 is 809.42 and the position 428 is −3685.05.

$$x = A_S - x = -3685.05 \quad \text{Equation 8:}$$

Using the results of Equations 1-8 as reference, the thickness of any object 400, can then be calculated. That is, Equations 1-8 provide numerical values associated with the calibration of the imaging system using the object 400 with a known height, and those values can be used to determine thickness of any other objects where the height is unknown. Accordingly, the thickness of an object "O" with an unknown height can be calculated using the below equation, so long as two images (using different light sources) are captured.

$$H = \frac{y}{(O_S - x)} * (O_S - O_E) \quad \text{Equation 9}$$

Note that the result of the above Equation 9 is to be scaled back to inches. This is so because the y-axis value (i.e., height) is scaled from 0.063" to 63px at the beginning (i.e., starting at Equation 1). Further details relating to measurement of the ink film thickness are discussed with respect to FIG. 5.

FIG. 5 illustrates measurement data associated with the imaging system. In the embodiment of FIG. 5, the ink film thickness of an object 500, i.e., the layer of ink droplets deposited on a substrate by a printer, is determined based on the calibration performed and discussed in FIG. 4. The Equation 9 discussed in FIG. 4 is used in the discussion of FIG. 5 to calculate the ink film thickness.

In accordance with the embodiment, two images (each with a different light source) are captured and evaluated. An edge 502 of the object 500 ("$O_E$ 502") is measured by evaluating the image that has been captured using a parallel light source (e.g., the first set of LEDs of FIGS. 1A and 1B). A shadow 504 of the object 500 ("$O_S$ 504") is measured by evaluating the image that has been captured using an angled light source (e.g., the second set of LEDs of FIGS. 1A and 1B).

Referring the example measurement data illustrated in FIG. 5, the $O_S$ 504 is measured at 952.76px and the $O_E$ 502 is measured at 608.97px. Further, from the calculations discussed with reference to FIG. 4, the height 426 is 809.42 and the position 428 is −3685.05. Applying these values to the Equation 9, the following results:

$$H = \frac{y}{(952.76 - x)} * (952.76 - 608.97) \quad \text{Equation 9(a)}$$

$$H = \frac{809.42}{(952.76 - (-3685.05))} * (343.79) \quad \text{Equation 9(b)}$$

$$H = 60$$

Accordingly, the ink film thickness 506, or "H 506", is determined to be 60px based on measurements of the edge and shadow on two images captured using different light sources.

In some embodiments, an average drop volume of the ink droplets (in the layer deposited on the substrate) can be calculated by leveraging the value calculated for the ink film thickness (i.e., value of "H"). Among other benefits, calculation of the average drop volume by this technique of the disclosed technology can work well with full UV inks because they have a negligible evaporative component.

The drop volume can be calculated by averaging a substantially large number of droplets. For example, a printer can print 216,000 drops/in$^2$ (600×360 DPI), and build this amount up by 100 times using 21.6 million drops. From a one-inch square of this printed substrate having droplets of an unknown thickness, the imaging system with the differential lighting can measure the thickness to be at 0.0274". The calculations are as follows:

1.0000×1.0000×0.0274=0.0274 in3

1 in3=16,387,064,000pl 16,387,064,000×0.0274/21,600,000=20.78pl

Note that the thicker is the layer, the more accurate is the result. For example, at ±0.0015", the 0.0274" measurement is nearly ±6% of the total. On the other hand, at 0.06", for example, the 0.0274" measurement is near 5% of the total.

Figure 6:
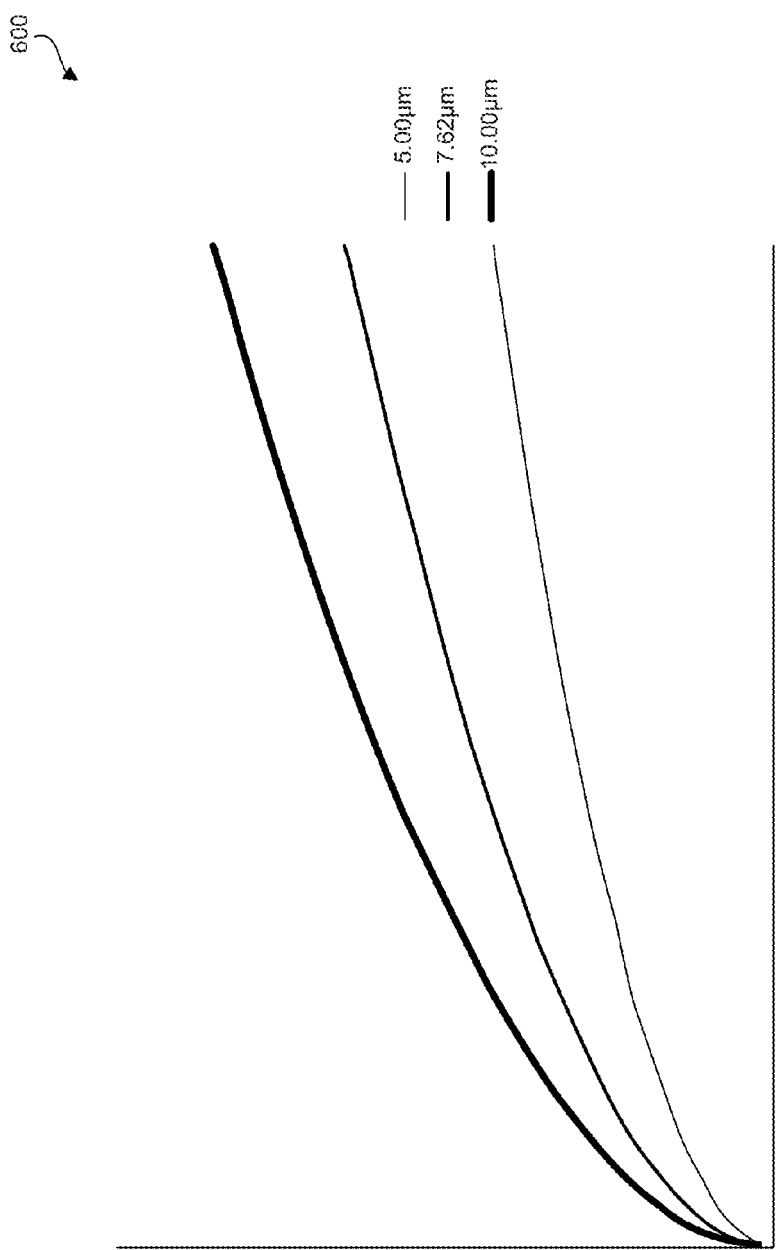
FIG. 6 illustrates a graphical chart of data associated with field of view and resolution.

FIG. 6 illustrates a graphical chart 600 of data associated with field of view and resolution. The graphical chart illustrated in the embodiment of FIG. 6 includes data for an example camera having 5MP. With such camera, at a 0.75" field of view, each pixel is approximately 7.62 μm.

In some embodiments, the imaging system utilizes a white light of a value of 5500K. In such embodiments, the light is able to provide a single color lighting while providing sufficient results for all colors. In other embodiments, additional lights, such as blue, make certain colors (e.g., yellow) easier to measure (higher contrast). However, other colors (i.e. blue) are made invisible. Accordingly, based on the disclosure of the disclosed technology, one could adjust the color of both light sources based on what one is looking for (e.g., using RGB lighting this is easily adjustable to find the highest contrast).

Computer System

Figure 7:
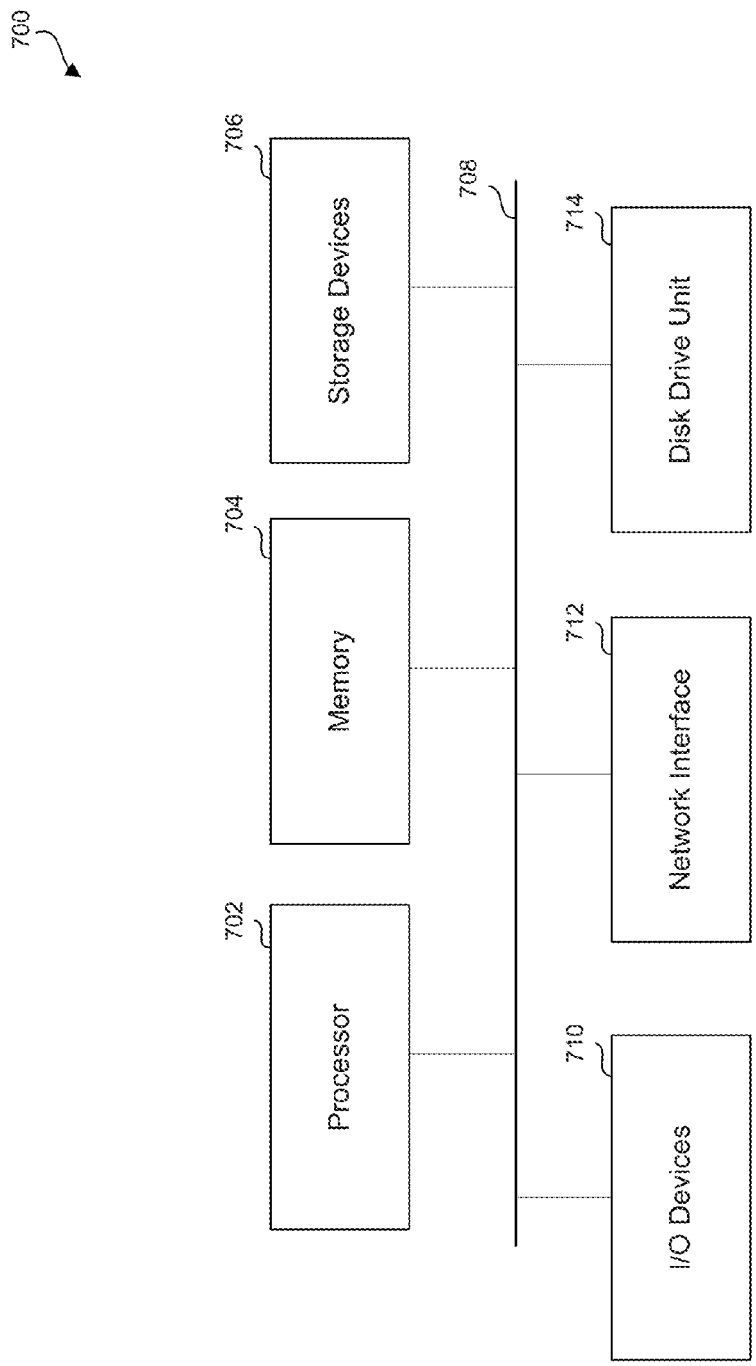
FIG. 7 is a block diagram of a computer system that can be used to implement various embodiments of the disclosed technology.

FIG. 7 is a block diagram of a machine in the exemplary form of a computer system 700 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 700 includes one or more central processing units ("processors) 702, a main memory 704 and a static memory 706, all of which communicate with one another via an interconnect 708. The interconnect 708 is illustrated as an abstraction that represents any one or more separate physical buses, point to point connections, or both connected by appropriate bridges, adapters, or controllers. The interconnect 708, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In some embodiments, the computer system 700 further includes one or more input and output device(s) 710. An example output device is a display unit, such as a liquid crystal display (LCD) or a cathode ray tube (CRT). An example input device is an alphanumeric input device, such as a keyboard, a cursor control device, a mouse, etc. In some embodiments, the computer system 700 further includes a network interface device 712 and a disk drive unit 714.

The disk drive unit 714 includes a machine-readable medium on which is stored a set of executable instructions, such as software and/or firmware, to carry out actions described above (e.g., to control operations of the imaging system). The software is also shown to reside, completely or at least partially, within the main memory 704 and/or within the processor 702 to program the processor(s) 702 to carry out the actions. The software or firmware may further be transmitted or received over a network by means of the network interface 712. For example, such software or firmware may be initially provided to the computer system 700 by downloading it from a remote system through the computing system 700 (e.g., via the network interface 712).

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

What is claimed is:

1. A method of measuring ink film thickness, comprising: causing the target object to be placed at a first position; capturing a first set of calibration images of the target object at the first position, the first set of calibration images including a first calibration image at the first position and a second calibration image at the first position, the first calibration image at the first position captured using the first light source that shines perpendicular to the target object at the first position, the second calibration image at the first position captured using the second light source that shines at the angle to the target object, wherein the second light source casts a first calibration shadow on the target object at the first position;
comparing the first calibration image at the first position and the second calibration image at the first position to determine a magnitude of the first calibration shadow;
causing the target object to be placed at a second position;
capturing a second set of calibration images of the target object at the second position, the second set of calibration images including a first calibration image at the second position and a second calibration image at the second position, the first calibration image at the second position captured using the first light source that shines perpendicular to the target object, the second calibration image at the second position captured using the second light source that shines at the angle to the target object, wherein the second light source casts a second calibration shadow on the target object at the second position;
comparing, by a processor, the first calibration image at the second position and the second calibration image at the second position to determine the magnitude of the second calibration shadow;
determining, by the processor, a distance between the first and second calibration shadows;
determining, by the processor, a height of the second light source and a position of the second light source based on the distance determined;
capturing a first image of a target object using a first light source that shines a first light perpendicular to the target object, the target object being a layer of ink droplets;
capturing a second image of the target object using a second light source that shines a second light at an angle to the target object, wherein the second light source casts a shadow on the target object;
comparing the first image and the second image to determine a magnitude of the shadow of the target object; and
determining the ink film thickness based on the magnitude of the shadow.

2. The method of claim 1, wherein the position of the second light source is in inches.

3. The method of claim 2, further comprising converting the position of the second light source into pixels.

4. The method of claim 1, further comprising calculating the ink film thickness based on the height of the second light source and the position of the second light source.

5. A method, comprising:
capturing a first set of calibration images of the target object at a first position, the first set of calibration images including a first calibration image at the first position and a second calibration image at the first position, said capturing including:
producing, at the first position, a first light perpendicular to the target object to produce the first calibration image at the first position, the target object having a first height relative to a surface;
capturing the first calibration image at the first position produced by the first light;
producing, at the first position, a second light at an angle that is not perpendicular to the target object to produce the second calibration image at the first position, the second light casting a first calibration shadow of the target object on the surface; and
capturing the second calibration image at the first position, the second calibration image at the first position including the first calibration shadow;
comparing the first calibration image and the second calibration image to determine a magnitude of the first calibration shadow;
capturing a second set of calibration images of the target object at a second position, the second set of calibration images including a first calibration image at the second position and a second calibration image at the second position, said capturing including:

producing, at the second position, the first light perpendicular to the target object to produce the first calibration image at the second position;

capturing the first calibration image at the second position produced by the first light;

producing, at the second position, the second light at the angle that is not perpendicular to the target object to produce the second calibration image at the second position, the second light casting a second calibration shadow of the target object on the surface at the second position; and capturing the second calibration image at the second position, the second calibration image at the second position including the second calibration shadow;

comparing, by a processor, the first calibration image at the second position and the second calibration image at the second position to determine the magnitude of the second calibration shadow;

determining, by the processor, a distance between the first and second calibration shadows; and determining, by the processor, a height of the second light source and a position of the second light source based on the distance determined.

6. The method of claim 5, wherein the position of the second light source is in inches.

7. The method of claim 6, further comprising converting the position of the second light source into pixels.

8. The method of claim 5, further comprising calculating the ink film thickness based on the height of the second light source and the position of the second light source.

* * * * *